(12) United States Patent
Nakai et al.

(10) Patent No.: US 7,808,689 B2
(45) Date of Patent: Oct. 5, 2010

(54) IMAGE FORMING APPARATUS, AND SCANNING OPTICAL UNIT AND OPTICAL ELEMENT USED FOR THE APPARATUS

(75) Inventors: Jun Nakai, Matsusaka (JP); Hideki Sugimura, Katano (JP)

(73) Assignee: Kyocera Mita Corporation (JP)

( * ) Notice: Subject to any disclaimer, the term of this patent is extended or adjusted under 35 U.S.C. 154(b) by 737 days.

(21) Appl. No.: 11/694,346

(22) Filed: Mar. 30, 2007

(65) Prior Publication Data
US 2007/0229931 A1 Oct. 4, 2007

(30) Foreign Application Priority Data
Mar. 31, 2006 (JP) ............................. 2006-098313

(51) Int. Cl.
*G02B 26/08* (2006.01)
(52) U.S. Cl. .................................... 359/204.1; 359/818

(58) Field of Classification Search ............. 359/204.1, 359/818; 347/242, 257
See application file for complete search history.

(56) References Cited

U.S. PATENT DOCUMENTS
2004/0184127 A1* 9/2004 Nakajima et al. ........... 359/204

FOREIGN PATENT DOCUMENTS
JP   2002-228959 A   8/2002
JP   2004-258173 A   9/2004

* cited by examiner

*Primary Examiner*—James Phan (57) ABSTRACT

In an image forming apparatus in which light fluxes emitted from at least two light sources are brought close to one another to be allowed to enter the rotating reflector 35 to be allowed to scan the photoreceptor 39, the cylindrical lens presser spring 12 provided on the cylindrical lens supporting member 10 is positioned such that the lens presser spring 12 pushes the cylindrical lens at a position so that the light fluxes enter the cylindrical lens at ranges extending toward both strides from the lens presser spring 12.

10 Claims, 6 Drawing Sheets

IMAGE FORMING APPARATUS, AND SCANNING OPTICAL UNIT AND OPTICAL ELEMENT USED FOR THE APPARATUS

BACKGROUND OF THE INVENTION

1. Field of the Invention

The present invention relates to copying machines, printers, facsimiles, multi-function machines utilizing electrophotography and a scanning optical unit, specifically to an image forming apparatus having an optical system with which light from a light source is reflected by a rotating mirror to scan a photoreceptor and a scanning optical unit used for the apparatus.

2. Description of the Related Art

In an image forming machine such as a copying machine, printer, facsimile, and multi-function machine of them, there are demanded high image quality, high speed image forming, compactness of the apparatus, and low cost of the apparatus. Therefore, it is required to form images of high quality, reduce time required for image forming per sheet, simplify the construction of the apparatus, and reduce the number of parts constituting the apparatus.

Among them, as to increase in quality, fineness of pixels has been improved by minimizing the diameter of a light flux emitted from a light source. As to speeding-up of image formation, an image forming apparatus is proposed in which image forming time is reduced by allowing light beams from a plurality of light sources to be imaged on a photoreceptor in circumferential direction (hereafter referred to as secondary scanning direction) thereof and they are traversed in axial direction (hereafter referred to as primary scanning direction) of the photoreceptor so that a plurality of scans are carried out simultaneously along the axial direction.

For example, a multibeam combining type scanning and recording apparatus is disclosed in Japanese Laid-Open Patent Application No. 2002-228959, which includes a plurality of light emitting means, a light beam combining means for allowing the light beams to travel in the same direction such as a polarizing beam splitter, a deflecting means for deflecting the light beams allowed to travel in the same direction, a focusing means for imaging the deflected light beams on a surface to be scanned, a pair of wedge prisms each fixed in each of hollow micro-step motors rotatable in counter directions to one another to deflect at least one of the light beams so that it or they are imaged on the imaging surface in a state shifted in the secondary scanning direction, and a position adjusting slit unit as a means for detecting the amount of the shift in the secondary scanning direction.

Figure 6A:
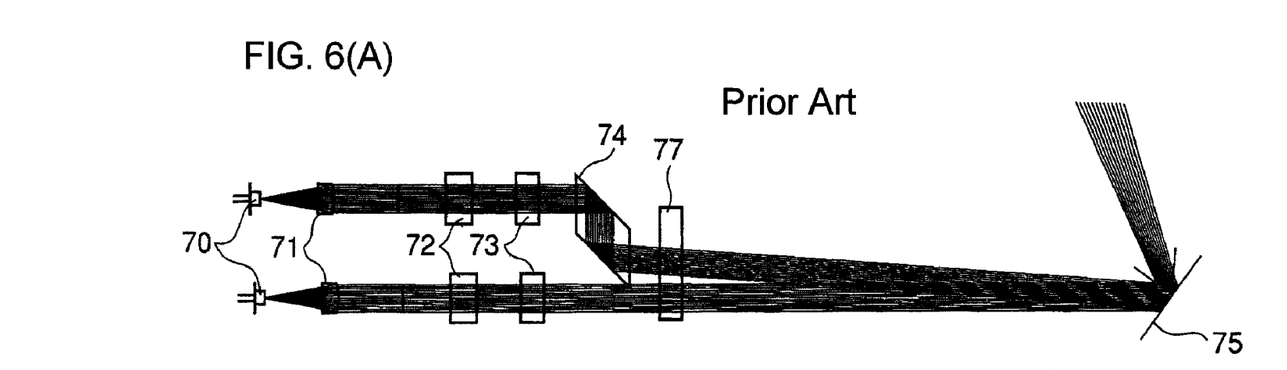
FIG. 6(A) is a schematic representation of the configuration of the scanning optical system used in a conventional image forming apparatus.

An optical scanning apparatus is disclosed in Japanese Laid-Open Patent Application No. 2004-258173, in which, as shown in FIG. 6(A), light fluxes from two light sources 70 such as laser diodes are collimated by collimators 71, fine adjustment of imaging positions of the light fluxes in the secondary scanning direction is effected by parallel glass plates 72, fine adjustment of angles of incidence of the light fluxes upon a reflection plane 75 of a rotating reflector is effected by wedge prisms 73, the light fluxes are trimmed through apertures, and one of the light fluxes is allowed to enter a prism 74 of triangular or nearly parallelogram cross section to be reflected from the internal reflection plane of the prism and changed in its light path so that the two light fluxes come close to one another and enter a cylindrical lens 77 to be focused on the reflection surface of the rotating reflector 75 at a prescribed tilt angle between the two light fluxes.

Figure 6B:
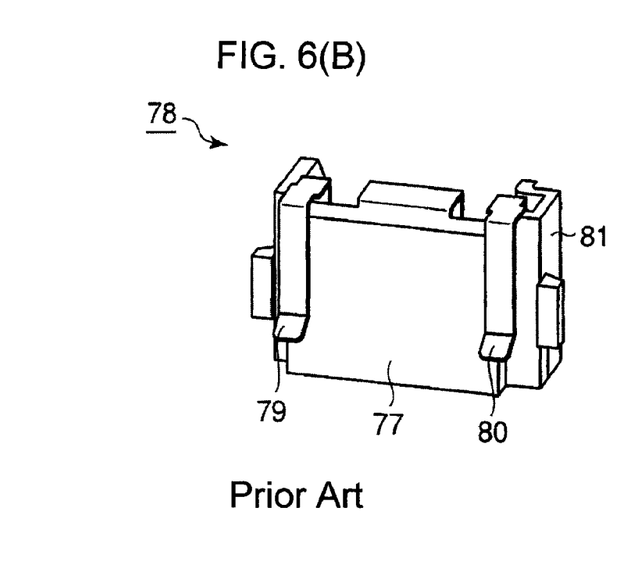
FIG. 6(B) and FIG. 6(C) are perspective views of the cylindrical lens and the supporting member thereof viewed from the incoming side and exiting side of light flux respectively.
Figure 6C:
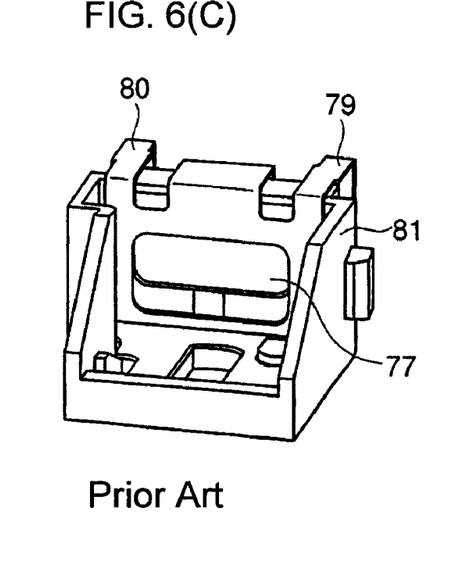

The cylindrical lens 77 used here is, as shown in perspective views of FIG. 6(B) and FIG. 6(C) of a supporting member of the cylindrical lens viewed from the incoming side and exiting side of light flux respectively, is supported by pressing both end parts of the cylindrical lens 77 with cylindrical lens presser springs 79 and 80 provided on a supporting frame 81 of the cylindrical lens 77 so that the light fluxes can pass through the central area of the cylindrical lens 77 between the presser springs.

However, in the multibeam combining type scanning and recording apparatus disclosed in said Japanese Laid-Open Patent Application No. 2002-228959, a $\lambda/2$ plate is used together with the polarizing beam splitter, so each of the light fluxes is reduced in half in light intensity on the polarization plane of the beam splitter. Therefore, it is necessary to increase light source intensity. It is also required to use light sources of stronger intensity when speeding up image forming speed because the time period for scanning the surface of the photoreceptor is reduced. When light intensity is reduced at the beam splitter, further stronger light sources are required, and electric power consumption increases and at the same time a countermeasure for heat generation of the light sources becomes necessary.

With the optical scanning apparatus disclosed in said Japanese Laid-Open Patent Application No. 2004-258173, attenuation of light by the prism and reflection mirror is small, so large attenuation in light intensity does not occur as does when the beam splitter is used, and strong light sources which require a strong power source are not required. But, in this case, an optical element (for example, the cylindrical lens 77) for concentrating light fluxes from each of the light sources 70 on the reflection plane 75 of the rotating reflector is required to be provided for each of the light sources or a lens of large aperture is required when each of the light fluxes is departed from one another (that means that the crossing angle of the incoming light fluxes to the reflection plane is large). Therefore, it is desirable that the light fluxes are allowed to be as close to one another as possible.

However, when the crossing angle is too small, there occurs a possibility that a corner of the prism 74 which is a light reflecting means interferes with the light flux traveling linearly and eclipses the light flux partly, resulting in that a desired light spot is not obtained on the scanning surface. Therefore, it is preferable that the crossing angle is such that the eclipse by the prism 74 does not occur, but for this is required a larger aperture of the cylindrical lens 77.

As has been explained referring to FIGS. 6(B) and (C), the cylindrical lens supporting member 78 for supporting the cylindrical lens 77 is composed such that the both end parts thereof in the longitudinal direction are held by the presser springs 79 and 80, the cylindrical lens has to be widened in the longitudinal direction in order to secure portions to hold the lens with the lens presser springs. Therefore, space for providing the cylindrical lens is increased inducing increase in cost. It is thinkable to provide a cylindrical lens for each light source, but this countermeasure results in increase in the number of parts and cost.

SUMMARY OF THE INVENTION

Therefore, the object of the invention is to provide an image forming apparatus which has at least two light sources, the light fluxes emitted from the light sources being allowed to be brought close to one another and focused on a photoreceptor close to one another in the secondary scanning direction, and an optical system to allow scanning along the primary scanning direction, and composed such that an effective scanning range can be secured on the photoreceptor without inducing loss in light intensity of the light fluxes emitted from the light sources and without necessity of increasing the size of a rotating reflector, and that cylindrical lens for concentrating the light fluxes on the reflection plane of the rotating reflector can also be small sized to enable decrease in manufacturing cost, and to provide an optical scanning unit used for the apparatus.

To attain the object, the present invention proposes an image forming apparatus comprising at least two light sources, an optical element for bringing a light flux emitted from one of the light sources close to a light flux or fluxes emitted from the other or others of the light sources, a cylindrical lens for focusing the light fluxes brought close to one another on a reflection plane of a rotating reflector, and a scanning optical system for imaging each of light fluxes reflected from the reflection plane of the rotary reflector on a photoreceptor, in which a lens holding member provided on a supporting member of the cylindrical lens presses the cylindrical lens at such a position that the light fluxes enter the cylindrical lens at ranges extending toward both sides from the lens holding member.

The optical scanning unit, according to the present invention, comprises at least two light sources, an optical element for bringing a light flux emitted from one of the light sources close to a light flux or fluxes emitted from the other or others of the light sources, a cylindrical lens for focusing the light fluxes brought close to one another on a reflection plane of the rotating reflector, and a scanning optical system for imaging each of light fluxes reflected from the reflection plane of the rotary reflector on a photoreceptor, and a lens holding member provided on a supporting member of said cylindrical lens presses the cylindrical lens at such a position that the light fluxes enter said cylindrical lens at ranges extending toward both sides from the lens holding member.

It is suitable that the optical scanning unit may comprise at least two light sources, an optical element for bringing a light flux emitted from one of said light sources close to a light flux or fluxes emitted from the other or others of the light sources, a cylindrical lens for focusing the light fluxes brought close to one another on a reflection plane of the rotating reflector, and a scanning optical system for imaging each of light fluxes reflected from the reflection plane of the rotary reflector on a photoreceptor; and that a lens holding member provided on a supporting member of said cylindrical lens may press the cylindrical lens at such a position that the light fluxes enter the cylindrical lens at ranges extending toward both sides from the lens holding member, and pressing force of said lens holding member at said pressing position may push the cylindrical lens so that two planes of the cylindrical lens are pressed against two planes respectively of the supporting member.

Further, the optical element may comprises at least two light sources, an optical element for bringing a light flux emitted from one of said light sources close to a light flux or fluxes emitted from the other or others of the light sources, and a lens for focusing the light fluxes brought close to one another on a reflection plane of the rotating reflector, and, in the element, a lens holding member provided on a supporting member of the lens may press the lens at such a position that the light fluxes enter the lens at ranges extending toward both sides from the lens holding member.

By composing such that, a light flux emitted form one of the light sources is brought close to a light flux or fluxes emitted from the other or others of the light sources by use of an optical element, and a lens holding member provided on a supporting member of the cylindrical lens presses the cylindrical lens at such a position that the light fluxes enter the cylindrical lens at ranges extending toward both sides from the lens holding member, an effective scanning range can be secured on the photoreceptor without inducing loss in light intensity of the light fluxes emitted from the light sources and without necessity of increasing the size of a rotating reflector.

By composing such that pressing force of the lens holding member at the pressing position pushes the cylindrical lens so that two planes of the cylindrical lens are pressed against two planes respectively of the supporting member, the cylindrical lens can be reliably fixed by a single holding member and need not be increased in longitudinal length for securing fixing parts at both end parts thereof as is needed in the conventional scanning device mentioned before, so the cylindrical lens can be small sized, and an image forming apparatus and an optical scanning unit used for the apparatus can be obtained advantageously from point of view of space and cost.

By forming the pressing part of the lens holding member of elastic material and allowing the elastic material part of the lens holding member to press the cylindrical lens on its convex surface so that component forces are generated to act in two directions to press the lens against the two planes of said supporting member, the cylindrical lens can be held to the lens supporting member solid and rattle-free by the single holding member.

By composing the optical system located upstream of said cylindrical lens such that the light fluxes enter the cylindrical lens at ranges extending in longitudinal direction of said cylindrical lens to both sides from said lens holding member, occurrence of eclipse by the cylindrical lens holding member can be prevented unfailingly.

By composing such that the lens holding member presses the cylindrical lens so that component forces are generated to act toward travel direction side of the light fluxes and in a direction directing toward a plane of the supporting member on which the cylindrical lens is placed, the cylindrical lens can be held firmly also in light path direction.

By composing such that the cylindrical lens supporting member has two planes perpendicular to each other, a plane including top planes of supporting ribs (hereafter referred to as positioning ribs) on which said cylindrical lens is placed and a plane supporting for a light exiting plane of said cylindrical lens, and further, such that positioning ribs on which the cylindrical lens is placed for positioning and the lens holding member are provided on an optical component securing member, the cylindrical lens can be held securely by the single lens holding member with very simple construction.

As has been described heretofore, in the image forming apparatus and the optical scanning unit used in the image forming apparatus, an effective scanning range can be secured on the photoreceptor without inducing loss in light intensity of the light fluxes emitted from the light sources and without necessity of increasing the size of a rotating reflector by providing an optical element which allows the light flux emitted from one of a plurality of light sources to be brought close to a light flux or fluxes emitted from the other or others of the light sources. Further, the cylindrical lens need not be increased in longitudinal length by composing such that the cylindrical lens is pushed by a single lens holding member at such a position that the light fluxes enter the cylindrical lens at ranges extending toward both sides from the lens holding member. Furthermore, as the cylindrical lens is pushed by the lens holding member so that two planes of the cylindrical lens are pushed against two planes of the supporting member, the cylindrical lens is held securely to the supporting member by the single lens holding member, resulting in that the necessity of increasing longitudinal length of the cylindrical lens to secure regions for holding the lens at both end parts thereof is eliminated which is needed in the conventional optical scanning device. Accordingly, an image forming apparatus and an optical scanning unit used in the image forming apparatus can be provided advantageously from point of view of space and cost.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1A:
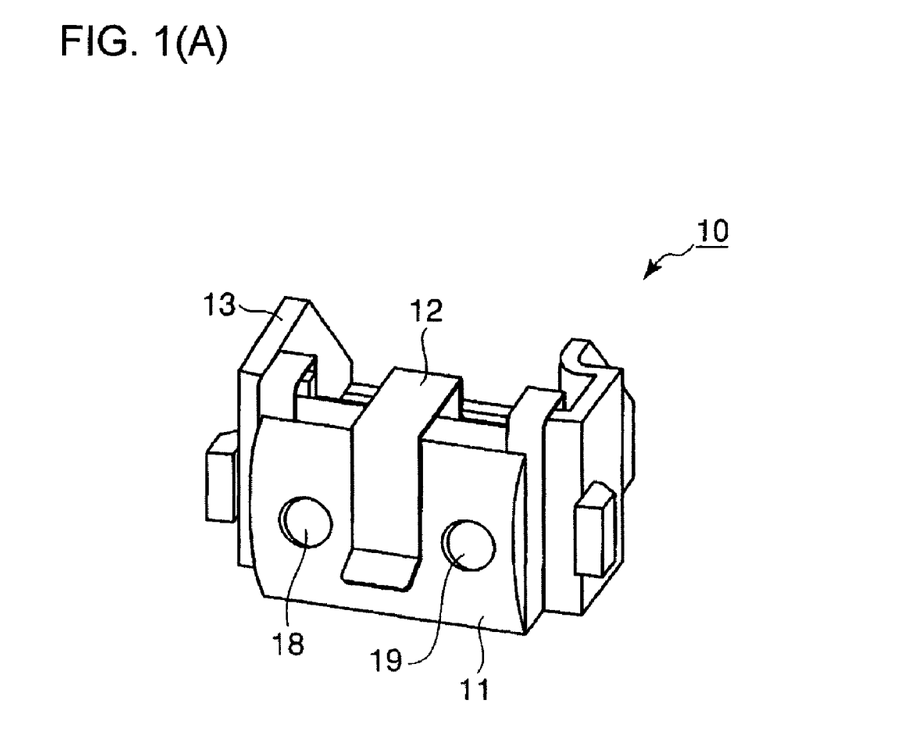
FIG. 1(A) and FIG. 1(B) are perspective views of the cylindrical lens composing the scanning optical system used in the image forming apparatus according to the present invention and the supporting member of the cylindrical lens viewed from the incoming side and exiting side of light fluxes respectively.
Figure 1B:
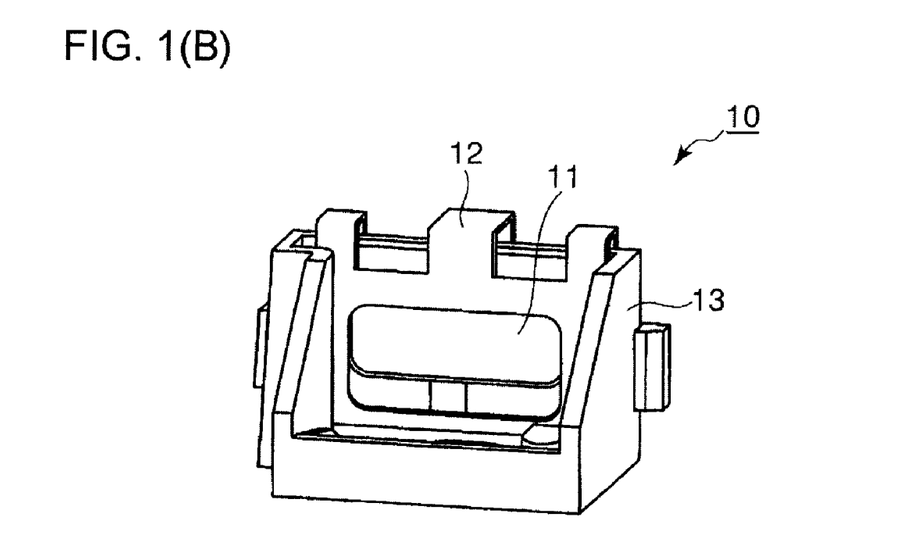
Figure 2A:
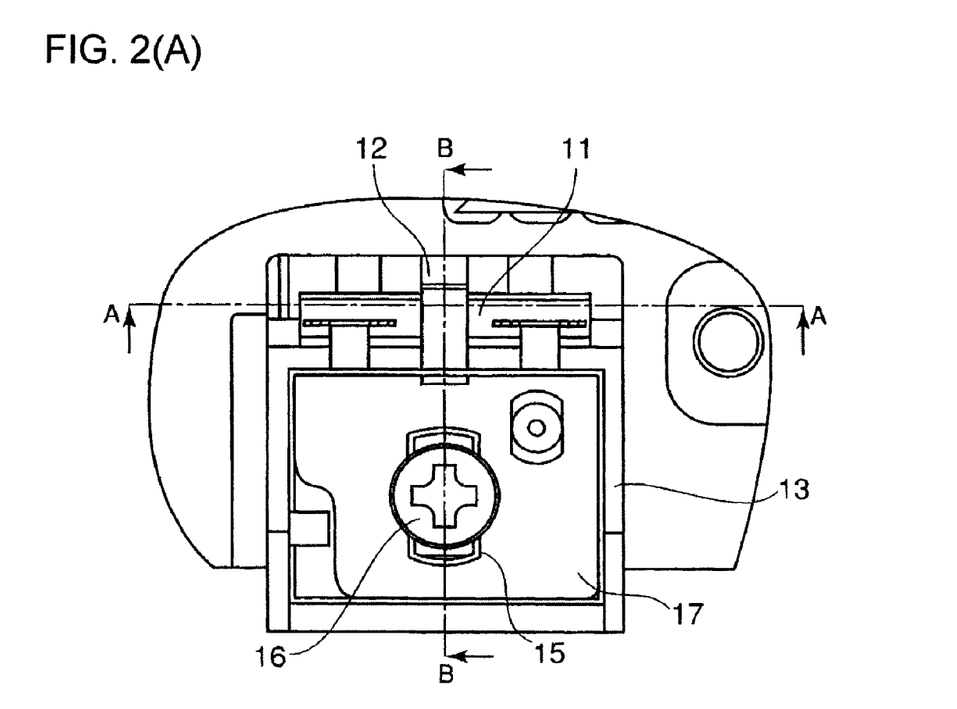
FIG. 2(A) is a top view of the cylindrical lens and the supporting member thereof.
Figure 2B:
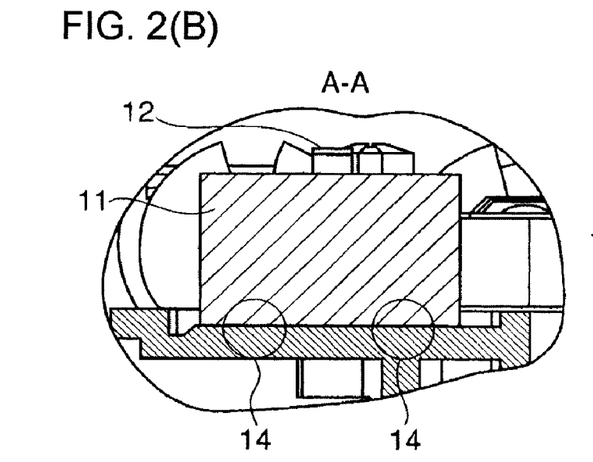
FIG. 2(B) is a sectional view along line A-A in FIG. 2(A)
Figure 2C:
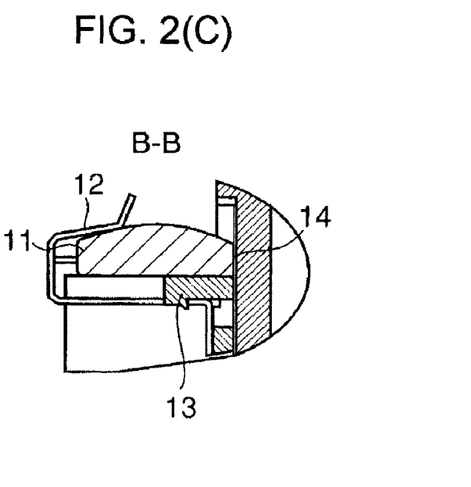
FIG. 2(C) is a sectional view along line B-B in FIG. 2(A).

FIG. 1(A) and FIG. 1(B) are perspective views of a cylindrical lens composing the scanning optical system used in the image forming apparatus according to the present invention and the supporting member of the cylindrical lens viewed from the incoming side and exiting side of light fluxes respectively, FIG. 2(A) is a top view of the cylindrical lens and the supporting member thereof, FIG. 2(B) is a sectional view along line A-A in FIG. 2(A), and FIG. 2(C) is a sectional view along line B-B in FIG. 2(A).

Figure 3:
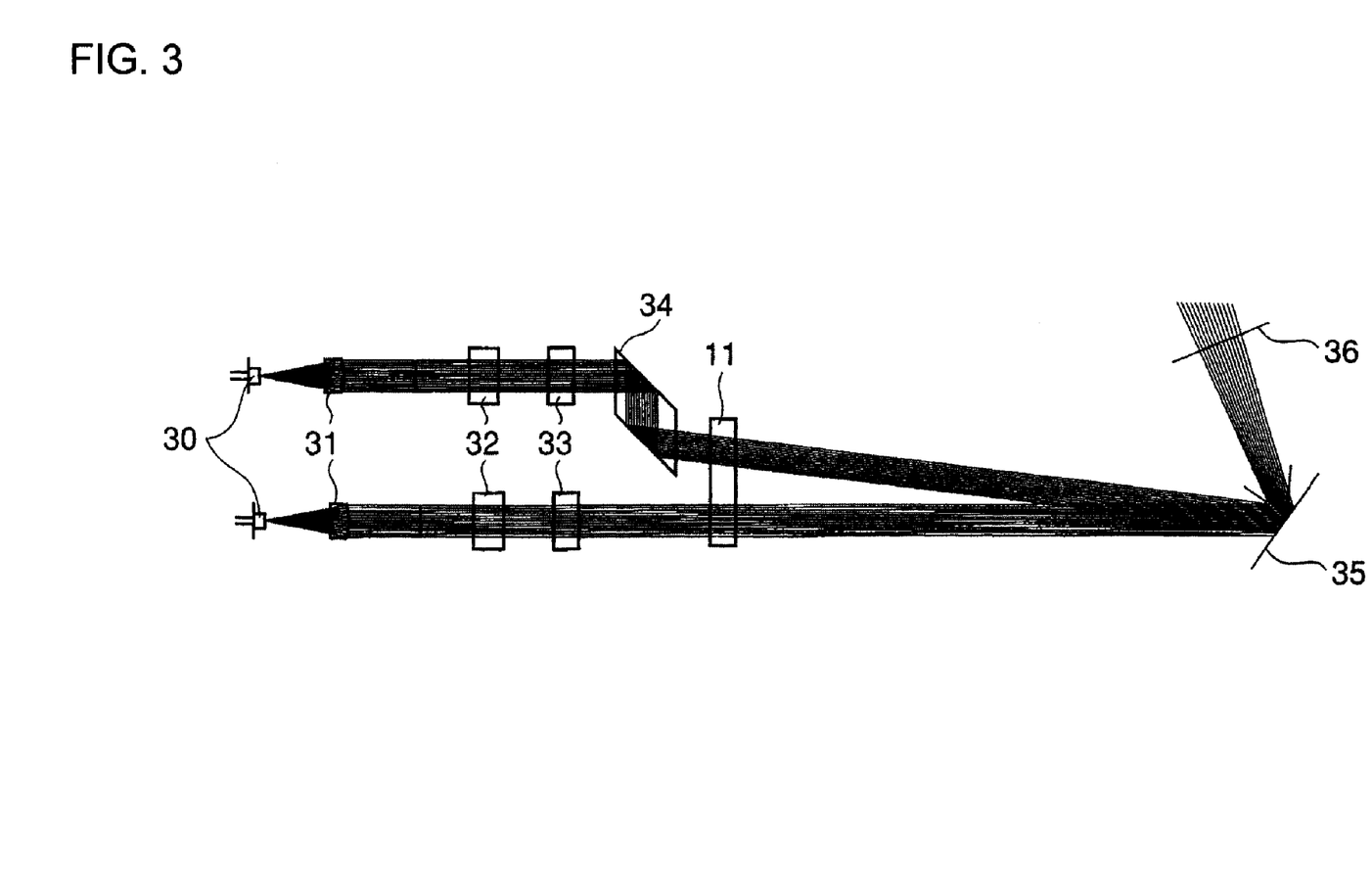
FIG. 3 is a schematic representation of the configuration of the scanning optical system used in the image forming apparatus according to the present invention.
Figure 4A:
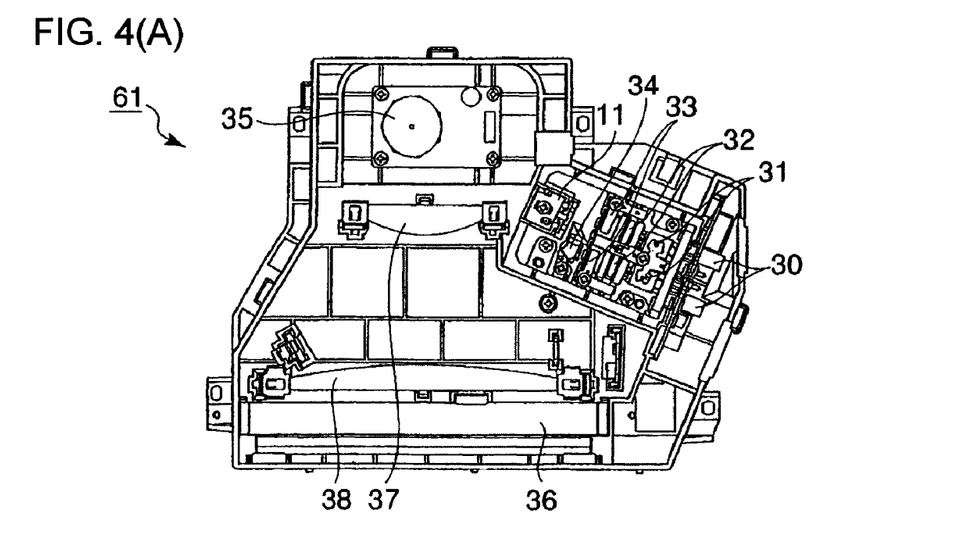
FIG. 4(A) is a plan view of the scanning optical system unit used in the image forming apparatus according to the present invention.
Figure 4B:
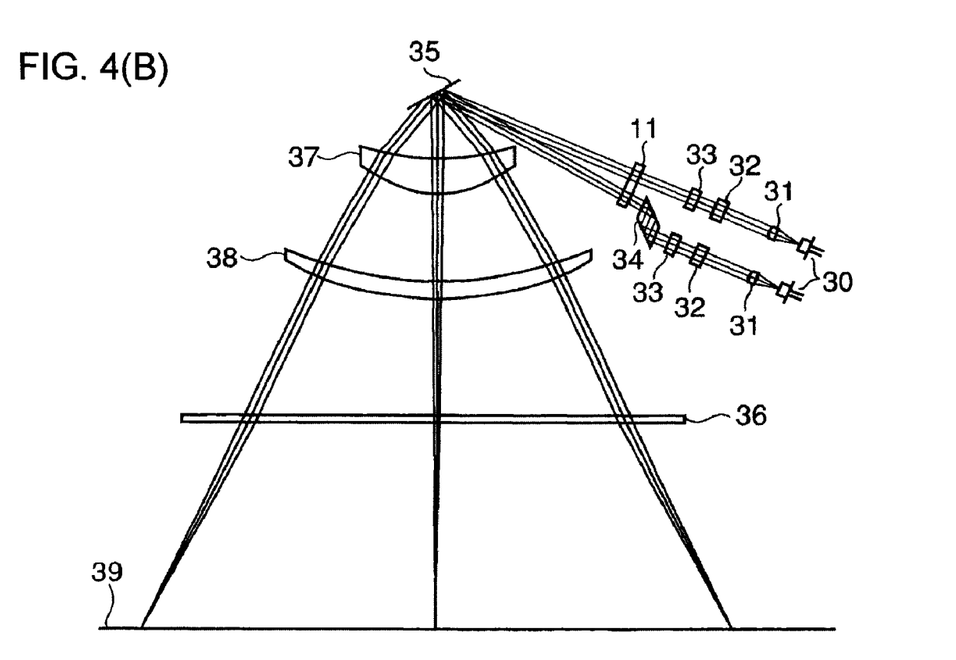
FIG. 4(B) is a schematic representation showing the light paths from the light sources to the photoreceptor.
Figure 5:
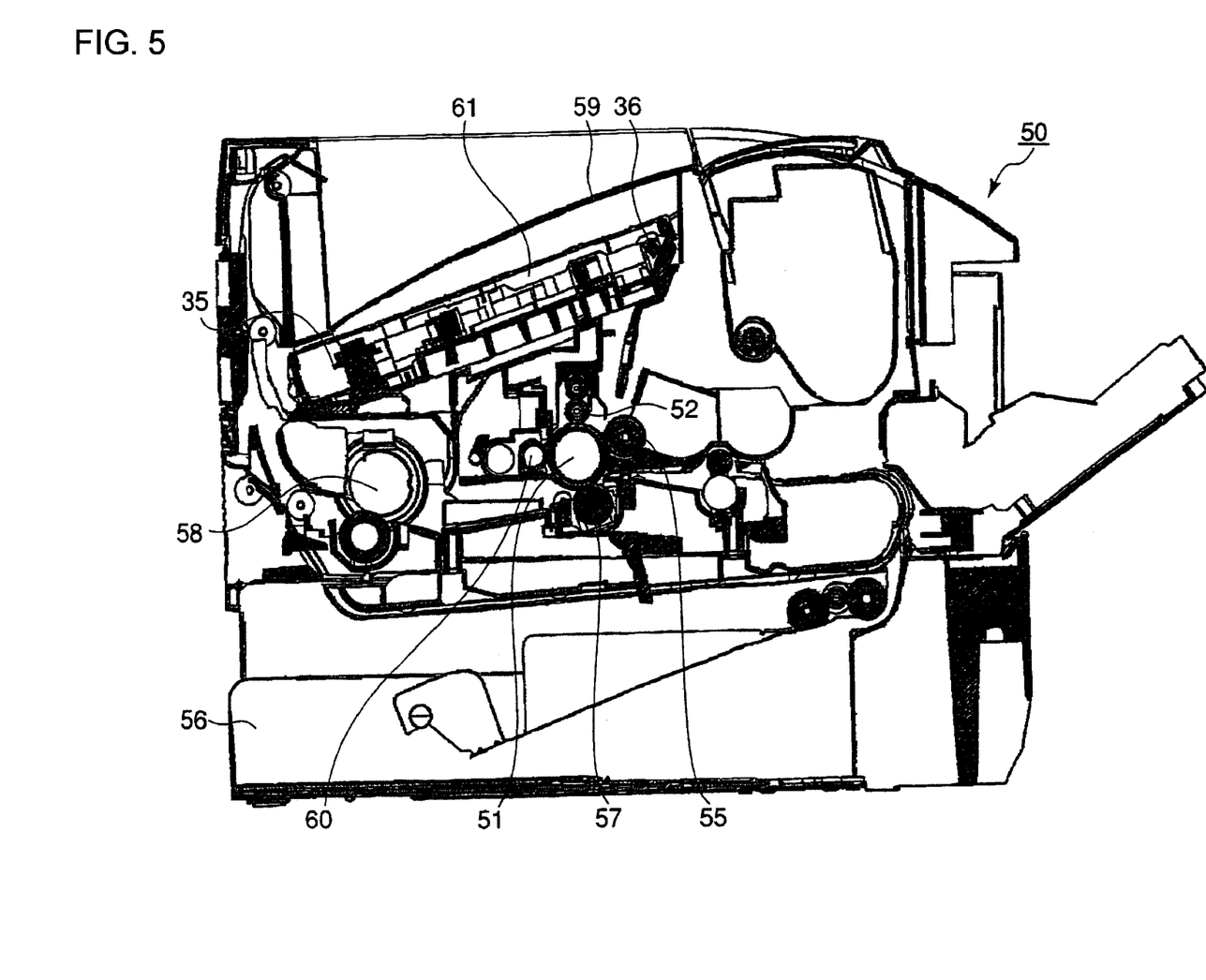
FIG. 5 is a schematic sectional view of the image forming apparatus according to the present invention.

FIG. 3 is a schematic representation of the configuration of the scanning optical system used in the image forming apparatus according to the present invention, FIG. 4(A) is a plan view of the scanning optical system unit used in the image forming apparatus according to the present invention, FIG. 4(B) is a schematic representation showing the light paths from the light sources to the photoreceptor, and FIG. 5 is a schematic sectional view of the image forming apparatus according to the present invention.

First, an image forming apparatus 50 according to the present invention will be briefly explained referring to FIG. 5. A photoreceptor 51 is electrostatically charged evenly by an electrification device upon a directive sent from a controller not shown in the drawing. Then, light modulated by image signals is sent to a polygon mirror 35 in a scanning optical unit 61 which includes a rotating reflector such as the polygon mirror 35 and a reflection mirror 36, reflected and deflected from there to scan the photoreceptor 51 to form an electrostatic image on the photoreceptor 51.

The electrostatic image is developed by a developing device 55 to be formed into a toner image, and the toner image is transferred by an image transfer device to a recording sheet fed from a recording sheet tray 56. The toner image on the recording sheet is fused by a fusing device 58, then the sheet is discharged through a recording sheet discharge line 59. Toner remaining on the photoreceptor 51 is cleaned by a cleaning device 60.

The optical scanning unit 61 mounted with the polygon mirror 35, reflection mirror 36, and other optical elements is shown in FIG. 4(A). In FIG. 4(A), the same component parts as those in FIG. 5 are denoted by the same reference numerals. In FIG. 4(A) and 4(B), reference numeral 30 indicates light sources such as laser diodes and two light sources are used in the apparatus of this example. Light fluxes emitted from the light sources 30 are collimated by collimator lenses 31, fine adjustment of imaging positions of the light fluxes in the secondary scanning direction is effected by parallel glass plates 32, and fine adjustment of incidence angles of the light fluxes upon a polygon mirror 35 is effected by wedge prisms 33, in the same way as explained referring to FIG. 6.

The light fluxes are trimmed through apertures not shown in the drawing. One of the light fluxes is allowed to enter the prism 34 of triangular or nearly parallelogram cross section. This light flux is reflected from the internal reflection plane of the prism 34 and deflected in its light path to be brought close to the other light flux. The light fluxes enter a cylindrical lens 11 to be focused on the reflection surface of the polygon mirror 35 at a prescribed tilt angle between the two light fluxes. The light fluxes reflected from the polygon mirror are allowed to pass through a first fθ lens 37 and a second fθ lens 38 and reflected from a reflection mirror 36 so that the light fluxes scan the scanning surface indicated by reference numeral 39 of the photoreceptor 51 (see FIG. 5) at about a constant traverse speed.

In FIG. 3 is shown light paths from the light sources 30 to the polygon mirror 35 more particularly. In FIG. 3, the same component parts as those in FIG. 4(B) are denoted by the same reference numerals. In FIG. 3, also two light sources 30 such as laser diodes are used. The light fluxes emitted from the light sources 30 are collimated by the collimator lenses 31, fine adjustment of imaging positions of the light fluxes in the secondary scanning direction is effected by the parallel glass plates 32, fine adjustment of incidence angles of the light fluxes upon the polygon mirror 35 is effected by the wedge prisms 33, and the light fluxes are trimmed through apertures not shown in the drawing. Then, one of the light fluxes is allowed to enter the prism 34 of triangular or nearly parallelogram cross section to be reflected from the internal reflection plane of the prism 34 and deflected in its light path to be brought close to the other light flux.

The light fluxes enter the cylindrical lens 11 to be focused on the reflection surface of the polygon mirror 35 at a prescribed tilt angle between the two light fluxes. FIG. 1 shows this cylindrical lens 11 together with its supporting member (optical component securing member), and supportive structure of the cylindrical lens 11 is shown in detail in FIG. 2(A) to FIG. 2(C) together with the cylindrical lens 11.

FIG. 1(A) is a perspective view of the cylindrical lens 11 and supporting member 10 thereof viewed from the incoming side of light, and FIG. 1(B) is the same viewed from the exiting side of light. The supporting member 10 for supporting the cylindrical lens 11 is provided with a cylindrical lens supporting frame 13 protruding vertically on a bottom plate 17 (see FIG. 2(A)) of nearly rectangular shape, and the cylindrical lens 11 is placed on positioning ribs 14 (see FIG. 2(C)). The cylindrical lens 11 is supported in a state it is pressed at about its central portion by a presser spring 12 provided on the cylindrical lens supporting frame 13, the presser spring being composed such that at least pressing part of the presser spring 12 is made of elastic material. The bottom plate 17, supporting frame 13, positioning ribs 14, etc. compose an optical component securing member. Therefore, the light fluxes emitted from the light sources and collimated enter the cylindrical lens 11 at portions situated on either side of the presser spring 12 as shown by reference numerals 18, 19 in FIG. 1(A).

FIG. 2(A) shows a top view of the optical component securing member including the cylindrical lens supporting member 10 with the cylindrical lens 11 mounted thereto. Cross sectional views along line A-A and B-B are shown respectively in FIG. 2(B) and FIG. 2(C). As explained referring to FIG. 1(A) and (B), the cylindrical lens 11 is placed on the positioning ribs that are formed at portions indicated by reference numeral 14 and held by the supporting member 10 by clamping the central part in the longitudinal direction thereof with the lens presser spring 12 provided on the cylindrical lens supporting frame 13. The lens presser spring 12 presses the convex surface of the cylindrical lens 11 so that component forces are generated to press the lens against two planes, the supporting plane of the supporting frame 13 and the supporting plane consisting of top planes of the positioning ribs 14, that is, toward the traveling direction side of the light fluxes and toward the ribs 14, as shown in FIG. 2(C).

Therefore, the cylindrical lens 11 is held solid and rattle-free by the lens supporting member 10. The cylindrical lens supporting member 10 is fixed securely to the body of the image forming apparatus by means of a positioning screw 16 passing through a hole 15 drilled in to the bottom plate 17.

With the construction of the cylindrical lens supporting member 10, both end parts of the cylindrical lens in the longitudinal direction thereof are not necessary to be clamped by presser springs as are with the conventional construction of the lens supporting member, the cylindrical lens 11 can be reduced in its longitudinal length, and the image forming apparatus can be provided advantageously from point of view of space and cost.

As the cylindrical lens presser spring 12 presses the convex surface of the cylindrical lens 11 so that component forces are generated in two directions, toward traveling direction side of the light fluxes and toward the ribs 14, the cylindrical lens 11 can be held solid and rattle-free by the lens supporting member 10.

Explanation was done in the case the number of light sources is two in the foregoing, similar composition can be adopted when the number of light sources is larger than two. For example, it is possible to compose such that two or three light fluxes enter the cylindrical lens 11 in each of the right and left regions of the cylindrical lens extending from the lens holding member (lens presser spring 12) toward both end sides. In this case, a light flux adjacent the lens presser spring clamping the central region of the cylindrical lens in the longitudinal direction is used as a reference light flux and an optical element is arranged such that other light fluxes are brought close to the reference light flux. By composing like this, the number of light sources is increased and the number of lines to scan an image for image forming is increased.

INDUSTRIAL APPLICABILITY

According to the invention, high image quality, high speed image forming, compactness of the apparatus, and low cost of the image forming apparatus can be attained.

The invention claimed is:

1. An image forming apparatus comprising,
   at least two light sources,
   an optical element for bringing a light flux emitted from one of said light sources close to a light flux or fluxes emitted from the other or others of said light sources,
   a cylindrical lens for focusing said light fluxes brought close to one another on a reflection plane of a rotating reflector, and
   a scanning optical system for imaging each of light fluxes reflected from the reflection plane of the rotary reflector on a photoreceptor;
   wherein a lens holding member provided on a supporting member of said cylindrical lens presses the cylindrical lens at such a position that said light fluxes enter said cylindrical lens at each of ranges extending toward both sides from said lens holding member, respectively.

2. An image forming apparatus according to claim 1, wherein pressing force of said lens holding member at said pressing position pushes said cylindrical lens so that two planes of said cylindrical lens are pressed against two planes respectively of said supporting member.

3. An image forming apparatus according to claim 1, wherein the pressing part of said lens holding member is formed of elastic material, and the elastic material part of the lens holding member presses said cylindrical lens on its convex surface so that component forces are generated to act in two directions to press the lens against said two planes of said supporting member.

4. An image forming apparatus according to claim 1, wherein an optical system located upstream of said cylindrical lens is composed such that said light fluxes enter said cylindrical lens at ranges extending in longitudinal direction of said cylindrical lens to both sides from said lens holding member.

5. An image forming apparatus according to claim 4, wherein said lens holding member presses said cylindrical lens so that component forces are generated to act toward travel direction side of said light fluxes and in a direction directing toward a plane of said supporting member on which the cylindrical lens is placed.

6. An image forming apparatus according to claim 1, wherein said cylindrical lens supporting member has two planes perpendicular to each other, a plane including top planes of supporting ribs (hereafter referred to as positioning ribs) on which said cylindrical lens is placed and a plane for supporting a light exiting plane of said cylindrical lens.

7. An image forming apparatus according to claim 1, wherein positioning ribs on which the cylindrical lens is placed for positioning and said lens holding member are provided on an optical component securing member.

8. An optical scanning unit comprising,
   at least two light sources,
   an optical element for bringing a light flux emitted from one of said light sources close to a light flux or fluxes emitted from the other or others of said light sources,
   a cylindrical lens for focusing said light fluxes brought close to one another on a reflection plane of a rotating reflector, and a scanning optical system for imaging each of light fluxes reflected from the reflection plane of the rotary reflector on a photoreceptor;

wherein a lens holding member provided on a supporting member of said cylindrical lens presses the cylindrical lens at such a position that said light fluxes enter said cylindrical lens at each of ranges extending toward both sides from said lens holding member, respectively.

9. An optical scanning unit comprising, at least two light sources, an optical element for bringing a light flux emitted from one of said light sources close to a light flux or fluxes emitted from the other or others of said light sources, a cylindrical lens for focusing said light fluxes brought close to one another on a reflection plane of a rotating reflector, and a scanning optical system for imaging each of light fluxes reflected from the reflection plane of the rotary reflector on a photoreceptor;

wherein a lens holding member provided on a supporting member of said cylindrical lens presses the cylindrical lens at such a position that said light fluxes enter said cylindrical lens at each of ranges extending toward both sides from said lens holding member, respectively, and wherein pressing force of said lens holding member at said pressing position pushes said cylindrical lens so that two planes of said cylindrical lens are pressed against two planes respectively of said supporting member.

10. A pre-scan optical system comprising, at least two light sources, an optical element for bringing a light flux emitted from one of said light sources close to a light flux or fluxes emitted from the other or others of said light sources, and a lens for focusing said light fluxes brought close to one another on a reflection plane of a rotating reflector;

wherein a lens holding member provided on a supporting member of said lens presses the lens at such a position that said light fluxes enter said lens at each of ranges extending toward both sides from said lens holding member, respectively.

* * * * *